US011135902B2

(12) United States Patent
Suzuki et al.

(10) Patent No.: US 11,135,902 B2
(45) Date of Patent: Oct. 5, 2021

(54) IMPACT ABSORPTION MEMBER (71) Applicant: NIPPON STEEL & SUMITOMO METAL CORPORATION, Tokyo (JP)

(72) Inventors: Toshiya Suzuki, Tokyo (JP); Yoshiaki Nakazawa, Tokyo (JP); Yasuhiro Ito, Tokyo (JP); Satoshi Shirakami, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 11 days.

(21) Appl. No.: 16/320,978

(22) PCT Filed: Jul. 26, 2017

(86) PCT No.: PCT/JP2017/027080
§ 371 (c)(1),
(2) Date: Jan. 25, 2019

(87) PCT Pub. No.: WO2018/021422
PCT Pub. Date: Feb. 1, 2018

(65) Prior Publication Data
US 2019/0168587 A1 Jun. 6, 2019

(30) Foreign Application Priority Data
Jul. 28, 2016 (JP) .............................. JP2016-148792

(51) Int. Cl.
*B60J 5/04* (2006.01)
*B60J 5/00* (2006.01)
*B60R 21/04* (2006.01)

(52) U.S. Cl.
CPC .............. *B60J 5/0441* (2013.01); *B60J 5/00* (2013.01); *B60J 5/0423* (2013.01); *B60J 5/0444* (2013.01);
(Continued)

(58) Field of Classification Search
CPC ... B60J 5/04; B60J 5/042; B60J 5/0441; B60J 5/0444; B60J 5/045; B60R 21/04; B60R 21/0428
(Continued)

(56) References Cited

U.S. PATENT DOCUMENTS 5,795,013 A * 8/1998 Keller ..................... B60R 13/02
280/751
6,196,619 B1 3/2001 Townsend et al.
(Continued)

FOREIGN PATENT DOCUMENTS

EP 1364821 A1 11/2003
JP 4-208634 A 7/1992
(Continued)

OTHER PUBLICATIONS

Japanese Office Action for corresponding Japanese Application No. 2018-530363, dated Jan. 7, 2020, with an English translation.
(Continued)

*Primary Examiner* — Jason S Daniels
(74) *Attorney, Agent, or Firm* — Birch, Stewart, Kolasch & Birch, LLP (57) ABSTRACT

[Object] To make it possible to make impact absorption at the time of a collision even when there is no sufficient space. [Solution] An impact absorption member according to the present invention includes: a member that is placed adjacent to an exterior material 110 of an automobile and in which a height in a direction orthogonal to the exterior material is larger than a width in a direction along the exterior material in a cross section orthogonal to an extending direction of the member. By this configuration, a first member 122 and a second member 124 are arranged so as to extend in different directions and be adjacent to the exterior material 110 of an
(Continued)

automobile, and therefore impact absorption at the time of a collision can be made even when there is no sufficient space.

12 Claims, 8 Drawing Sheets

(52) U.S. Cl.
CPC .. *B60R 21/0428* (2013.01); *B60R 2021/0414* (2013.01)

(58) Field of Classification Search
USPC ...................................................... 296/146.6
See application file for complete search history.

(56) References Cited

U.S. PATENT DOCUMENTS

| | | | |
|---|---|---|---|
| 6,302,474 | B1 | 10/2001 | Drysdale et al. |
| 6,416,114 | B1* | 7/2002 | Topker .................. B60J 5/0443 296/146.6 |
| 7,124,541 | B2* | 10/2006 | Fellner .................. B60J 5/0412 49/502 |
| 9,500,250 | B2* | 11/2016 | Tamada ................. B60R 21/04 |
| 2002/0148198 | A1 | 10/2002 | Wycech |
| 2012/0056445 | A1* | 3/2012 | Golovashchenko ... B62D 25/16 296/191 |

FOREIGN PATENT DOCUMENTS

| | | |
|---|---|---|
| JP | 5-319092 A | 12/1993 |
| JP | 2003-205741 A | 7/2003 |
| JP | 2004-345507 A | 12/2004 |
| JP | 2005-329412 A | 12/2005 |
| JP | 2009-51377 A | 3/2009 |

OTHER PUBLICATIONS

English translation of the Written Opinion of the International Searching Authority for PCT/JP2017/027080 (PCT/ISA/237) dated Oct. 10, 2017.
Extended European Search Report, dated Jan. 30, 2020, for corresponding European Application No. 17834424.8.
International Search Report for PCT/JP2017/027080 (PCT/ISA/210) dated Oct. 10, 2017.
Office Action issued in corresponding TW Application No. 106125488 dated Jun. 19, 2018.
Written Opinion of the International Searching Authority for PCT/JP2017/027080 (PCT/ISA/237) dated Oct. 10, 2017.

* cited by examiner

IMPACT ABSORPTION MEMBER

TECHNICAL FIELD

The present invention relates to an impact absorption member.

BACKGROUND ART

Thus far, to protect an occupant of an automobile, an impact absorption member has been placed in the interior of the automobile to aim at a place where an impact is expected to be inputted. As such an impact absorption member, for example, a door impact bar is known. For example, Patent Literature 1 below describes the structure of a door impact bar of an automobile.

CITATION LIST

Patent Literature

Patent Literature 1: JP H5-319092A

SUMMARY OF INVENTION

Technical Problem

However, the impact absorption member is formed of a thick structure body in order to ensure a certain amount of impact absorption. Hence, there is a limitation on the position where the impact absorption member is placed in the automobile. Further, in view of deformation at the time of a collision, the impact absorption member may be provided in an outer portion of the automobile (apart from an occupant) as much as possible; thereby, even when the amount of deformation of the impact absorption member is large, the impact absorption member does not come into contact with the occupant, and therefore the impact can be absorbed safely with good efficiency.

However, there is no sufficient space in a relatively outer portion of the interior of the automobile, and consequently it is difficult to place a thick member.

Thus, the present invention has been made in view of the problem mentioned above, and an object of the present invention is to provide a new and improved impact absorption member that can make impact absorption at the time of a collision even when there is no sufficient space.

Solution to Problem

To solve the problem described above, according to an aspect of the present invention, there is provided an impact absorption member including: a member that is placed adjacent to an exterior material of an automobile and in which a height in a direction orthogonal to the exterior material is larger than a width in a direction along the exterior material in a cross section orthogonal to an extending direction of the member.

A first member extending in a first direction; and a second member extending in a second direction different from the first direction and crossing the first member may be included.

In addition, the first member and the second member may be joined to the exterior material.

In addition, thicknesses of the first member and the second member in the direction orthogonal to the exterior material may be reduced in a cross portion between the first member and the second member.

In addition, a cross portion between a first member and a second member in which the second member is placed on a side of the exterior material may be present between cross portions between two first members and the second member in which the first members are placed on the side of the exterior material.

In addition, the first member or the second member may traverse the exterior material.

In addition, a supported portion supported on an opposite side to the exterior material may be present in at least one place in a longitudinal direction of the first member or the second member. A distance between a cross portion of the first member or the second member and the supported portion may be within ⅓ of a length of the first member or the second member in which the supported portion is present.

In addition, the supported portion may be an end portion of the first member or the second member.

In addition, the supported portion may be joined to some other component than the exterior material.

In addition, the member may be a hollow structure in which a sheet material is bent, and have a first surface adjacent to the exterior material and a second surface that is larger than the first surface in width orthogonal to the extending direction and is placed apart from the first surface.

In addition, the second surface may be divided along the extending direction.

In addition, the member may have a martensite structure.

Advantageous Effects of Invention

As described above, according to the present invention, impact absorption at the time of a collision can be made even when there is no sufficient space.

DESCRIPTION OF EMBODIMENTS

Hereinafter, (a) preferred embodiment(s) of the present invention will be described in detail with reference to the appended drawings. Note that, in this specification and the appended drawings, structural elements that have substantially the same function and structure are denoted with the same reference numerals, and repeated explanation of these structural elements is omitted.

Figure 1:
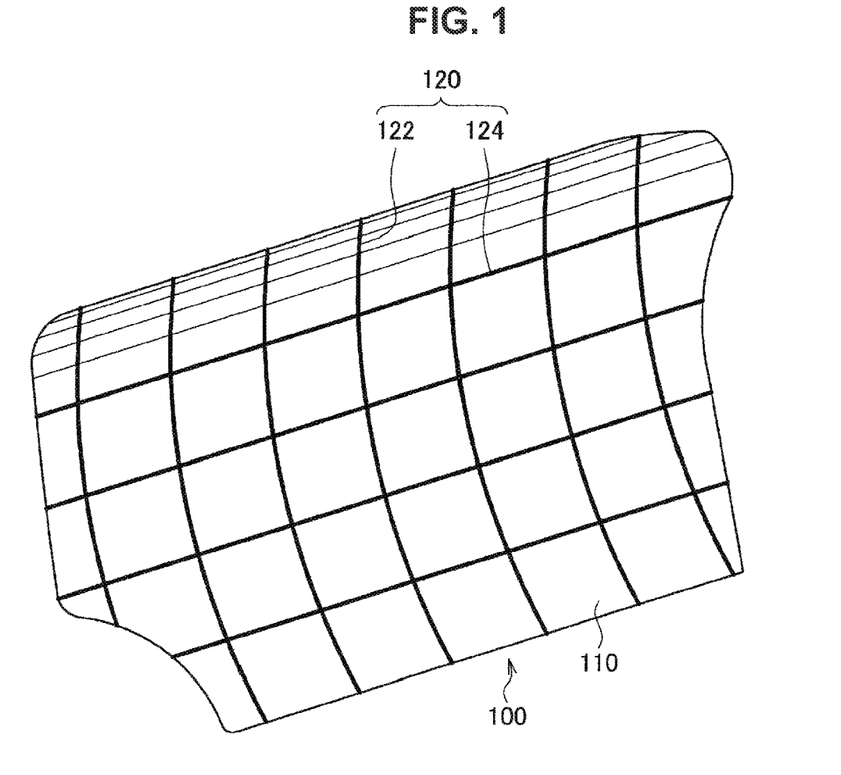
FIG. 1 is a schematic diagram showing a state where an automotive exterior panel according to the present embodiment is viewed from a back side.

First, a configuration of an automotive exterior panel according to an embodiment of the present invention is described with reference to FIG. 1. FIG. 1 is a schematic diagram showing a state where an automotive exterior panel 100 according to the present embodiment is viewed from the back side (the inside of the automobile). Herein, a door panel is shown as an example of the exterior panel 100, but the exterior panel 100 may be a panel of another part of the automobile, such as a fender, a hood, or a roof.

As shown in FIG. 1, the exterior panel 100 is composed of an exterior material 110 and reinforcing members 120. A panel member 112 is formed of a steel sheet with a thickness of approximately 0.4 mm, as an example. The exterior material 110 is curved such that the front side forms a convex surface. The curvature of the curve runs along the up and down direction.

The reinforcing members 120 include first reinforcing members 122 arranged in the up and down direction and second reinforcing members 124 arranged in the horizontal direction. It is desirable that the first reinforcing member 122 be curved to follow the curvature of the exterior material 110. The second reinforcing member 124 extends almost in a straight line; however, it is desirable that, in the case where the exterior material 110 is curved, the second reinforcing member 124 have a shape following the curve. This is because, when each of the first reinforcing member 122 and the second reinforcing member 124 has a shape following the exterior material 110, the member can be stuck to the exterior material 110 and preferably can be joined (adhered) to the exterior material 110.

Figure 2:
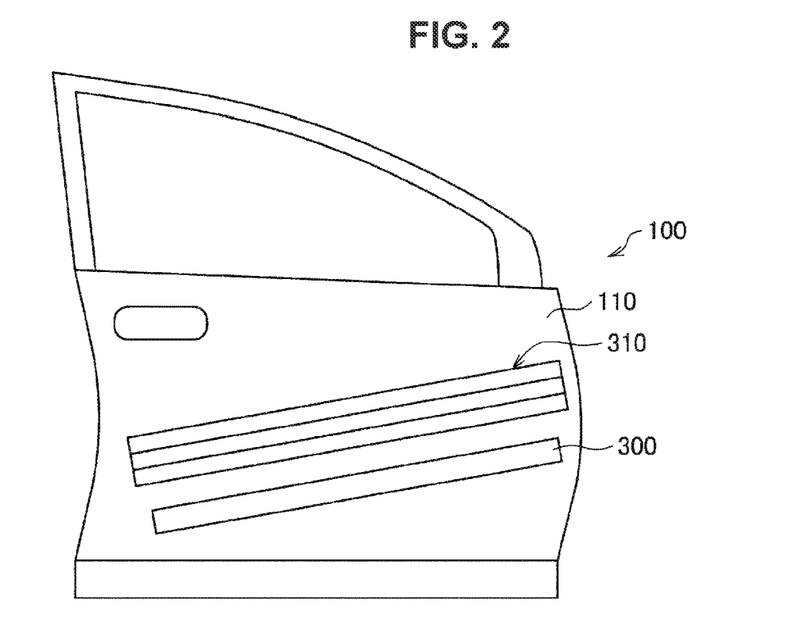
FIG. 2 is a schematic diagram showing a conventional structure for comparison, and is a schematic diagram showing a configuration in which a door impact bar and a reinforce are arranged on an inside of an exterior material.
Figure 3:
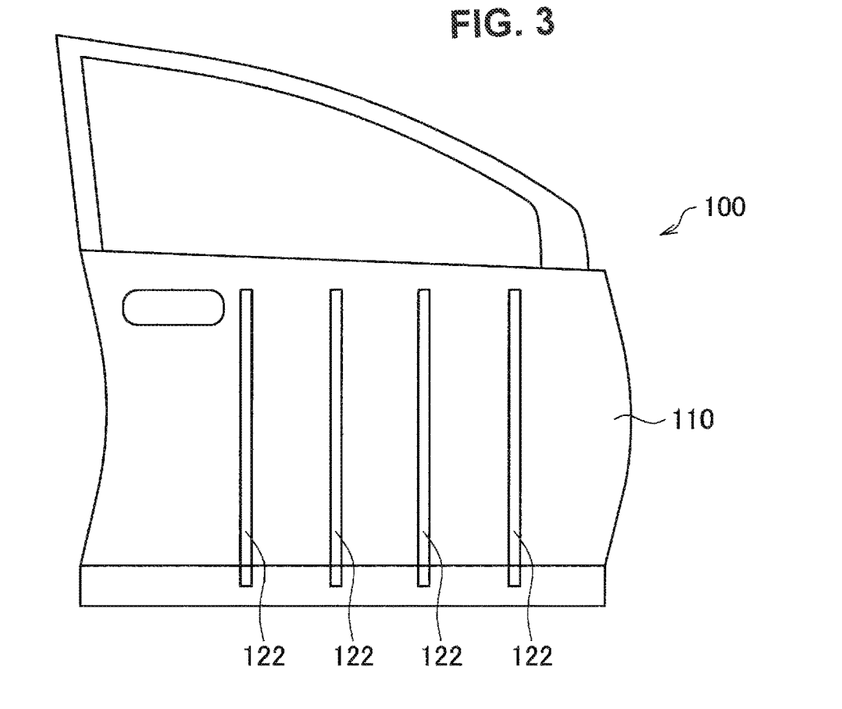
FIG. 3 is a schematic diagram showing a variation of an arrangement of reinforcing members.

FIG. 2 is a schematic diagram showing a conventional structure for comparison. In FIG. 2, a door impact bar 300 and a reinforce 310 are arranged on the inside of the exterior material 110. FIG. 3 to FIG. 7 are diagrams showing, as the exterior panel 100, automotive door panels according to the present embodiment. FIG. 3 to FIG. 7 are schematic diagrams showing variations of the arrangement of reinforcing members 120. The example shown in FIG. 3 shows an example in which only first reinforcing members 122 arranged in the up and down direction are provided in the exterior panel 100.

Figure 4:
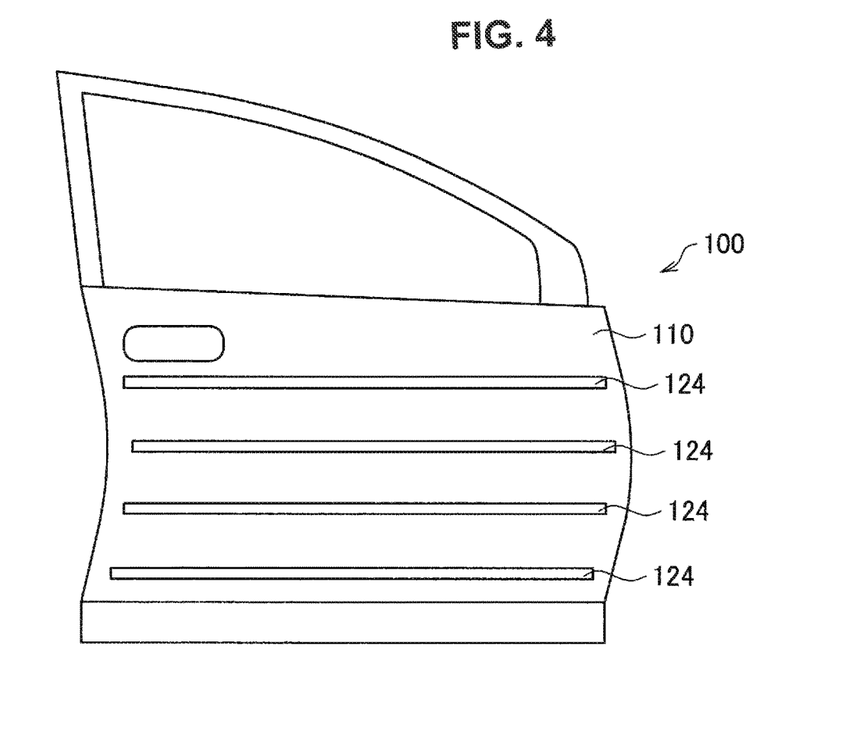
FIG. 4 is a schematic diagram showing a variation of an arrangement of reinforcing members.
Figure 5:
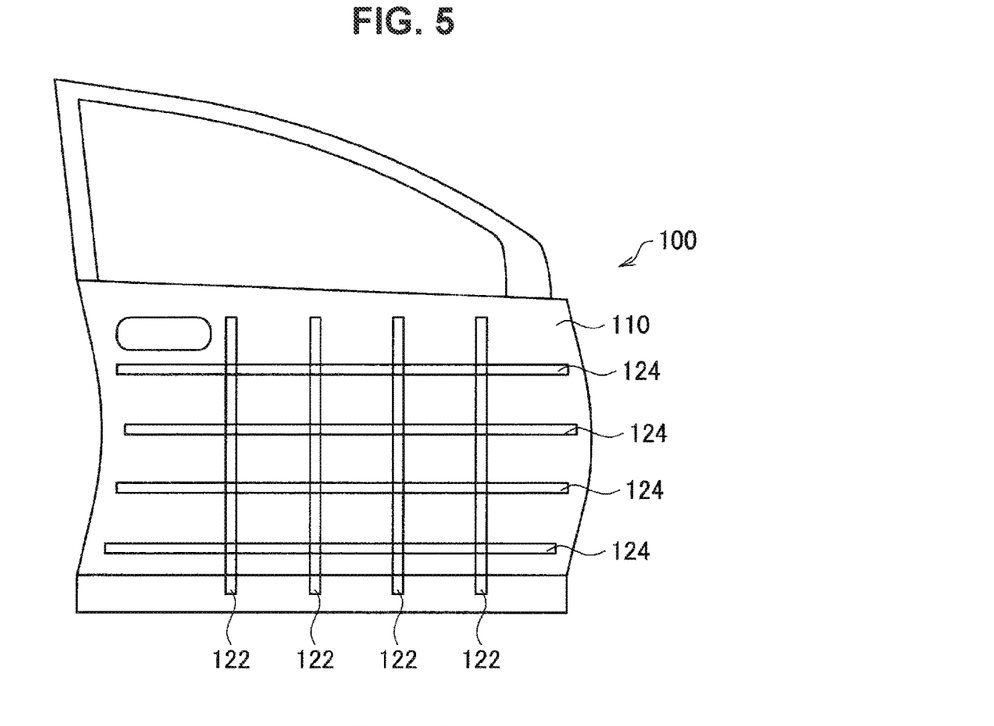
FIG. 5 is a schematic diagram showing a variation of an arrangement of reinforcing members.
Figure 6:
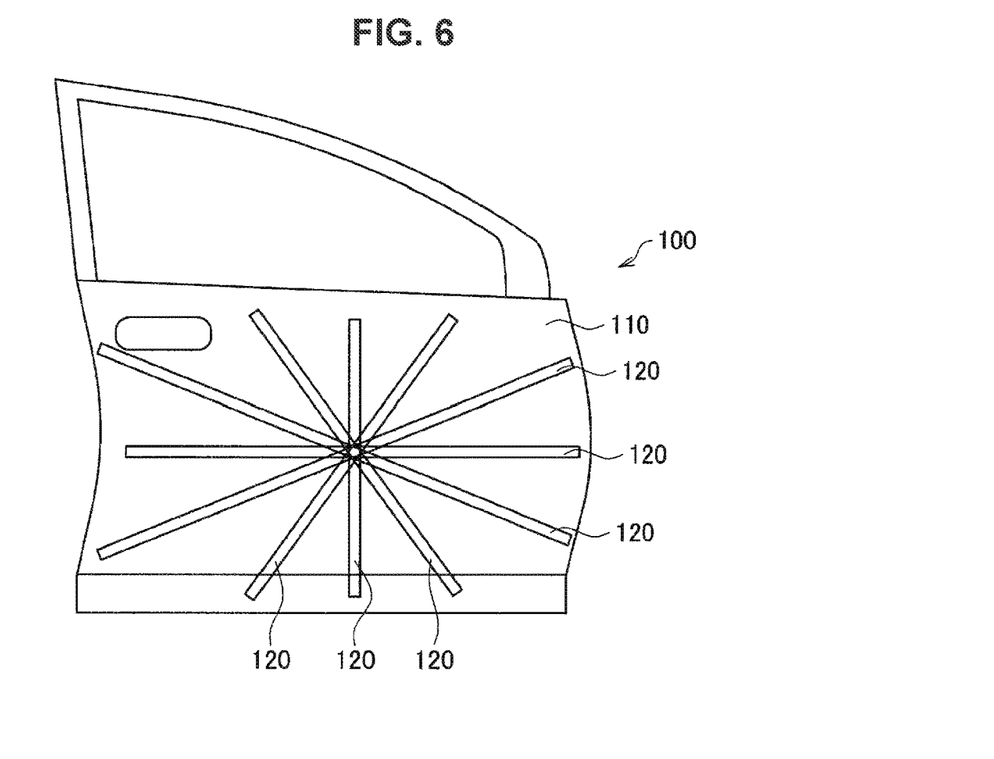
FIG. 6 is a schematic diagram showing a variation of an arrangement of reinforcing members.
Figure 7:
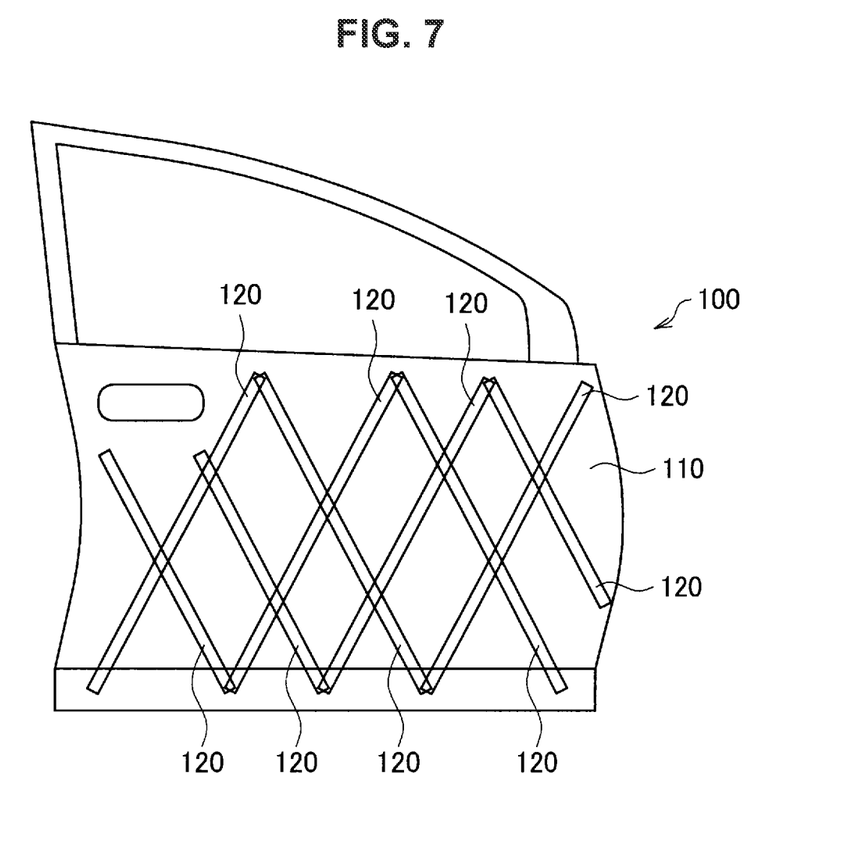
FIG. 7 is a schematic diagram showing a variation of an arrangement of reinforcing members.

Further, the example shown in FIG. 4 shows an example in which only second reinforcing members 124 arranged in the horizontal direction are provided in the exterior panel 100. The example shown in FIG. 5 shows an example in which first reinforcing members 122 arranged in the up and down direction and second reinforcing members 124 arranged in the horizontal direction are provided in the exterior panel 100. The example shown in FIG. 6 shows an example in which reinforcing members 120 are arranged radially in the exterior panel 100. The example shown in FIG. 7 shows an example in which reinforcing members 120 are arranged to cross obliquely in the exterior panel 100.

Figure 12:
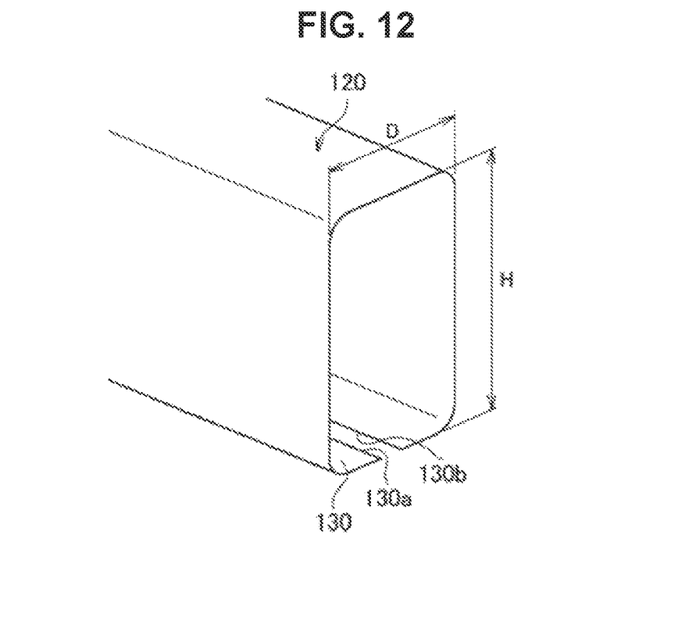
FIG. 12 is a schematic diagram showing a cross-sectional configuration in a direction orthogonal to a longitudinal direction of the first or second reinforcing member in the configuration of FIG. 8.

FIG. 12 is a perspective view showing a configuration of the reinforcing member 120. The basic configurations of the first reinforcing member 122 and the second reinforcing member 124 may be the same. FIG. 12 shows also a cross-sectional configuration orthogonal to the longitudinal direction of the reinforcing member 120. The reinforcing member 120 has a hollow, rectangular (a rectangle) cross section. The reinforcing member 120 is produced by bending a sheet material 130. In the example shown in FIG. 12, the reinforcing member 120 has a cross-sectional shape of a rectangle, with the long side set to approximately 16 mm and the short side to approximately 10 mm. The sheet thickness of the sheet material 130 forming the reinforcing member 120 is approximately 0.8 mm, as an example. A steel sheet may be used as the sheet material 130.

As shown in FIG. 12, a prescribed gap may be provided between end 130a and end 130b of the bent sheet material 130. On the other hand, end 130a and end 130b may be stuck together. Further, end 130a and end 130b may be joined together by welding, adhesion, or the like. The reinforcing member 120 is placed such that the surface on which ends 130a and 130b are located or the surface on the opposite side to the surface on which ends 130a and 130b are located is stuck to the exterior material 110. The surface on which ends 130a and 130b are located or the surface on the opposite side to the surface on which ends 130a and 130b are located is preferably joined to the exterior material 110. Here, the surface joined to or adjacent to the exterior material 110 is referred to as a bottom surface. Further, the surface on the opposite side to the bottom surface is referred to as a top surface. Each of the surfaces that are located on both sides of the bottom surface so as to sandwich ridgelines is referred to as a vertical wall. In the cross section of the reinforcing member 120, a short side is the bottom surface, and a long side is the vertical wall. In a configuration in which ends 130a and 130b are arranged on the top surface without being joined together, when the reinforcing member 120 is curved by being pushed from the outside of the exterior panel 100, it is likely that the cross section will open from ends 130a and 130b and the cross-sectional shape will collapse. However, when ends 130a and 130b are joined together, the cross-sectional shape can be prevented from collapsing, and therefore the rigidity of the exterior panel 100 can be enhanced more. Also in the case where ends 130a and 130b are arranged on the bottom surface and the bottom surface is joined to the exterior material 110, an event in which ends 130a and 130b are separated and the cross-sectional shape collapses can be prevented by the exterior material 110. The cross-sectional configuration of the reinforcing member 120 is not limited to a configuration like that of FIG. 12 in which ends 130a and 130b face each other, and may be a gutter-like (channel) shape in which ends 130a and 130b are apart or the hat shape shown in FIG. 16, for example. In the case where the cross section of the reinforcing member 120 is any of a rectangle, a gutter-like shape, and a hat shape, the short side of a cross section orthogonal to the extending direction of the reinforcing member 120 is regarded as a "width (D)," and the long side as a "height (H)." In the case where flanges are arranged on the exterior material 110 side in a hat shape like that shown in FIG. 16, the spacing between ridgelines each of which is located between a flange and a vertical wall is regarded as the "width (D)." In the case where the angle between the short side and the long side is not a right angle, the distance from the short side to an end of the long side in the vertical direction is regarded as the height. In the reinforcing member according to the present invention in which the "width" and the "height" are defined as above, the height of the reinforcing member is larger than the width. Although it is preferable that the width of the reinforcing member 120 be larger than the height in terms of joining the reinforcing member 120 to the exterior material 110, the present invention intentionally does not employ such a configuration. This is because priority is put on the enhancement of the second moment of area for the bending of the reinforcing member 120.

As above, in the present embodiment, for the reinforcing member 120 placed adjacent to the exterior material 110, the height in the direction orthogonal to the exterior material 110 is larger than the width in a direction along the exterior material 110 in a cross section orthogonal to the extending direction of the reinforcing member 120. This is because, in the case where a collision load in a direction from the car-body outside to the car-body inside of the exterior panel is applied, the second moment of area of the reinforcing member 120 can be improved effectively by this configuration. For the reinforcing member 120, the second moment of area in a direction orthogonal to the longitudinal direction may be set to less than or equal to 15,000 mm$^4$, and may be preferably set to less than or equal to 12,000 mm$^4$. The material quality, the sheet thickness, and the cross-sectional shape of the sheet material 130 of the reinforcing member 120 are set so as to satisfy this condition, as appropriate. By satisfying this condition, the plastic buckling limit of the reinforcing member 120 can be increased; hence, upon reception of the input of a collision load, plastic buckling is less likely to be caused; thus, reaction force based on elastic deformation can be utilized effectively for collision resistance properties. Note that reaction force based on elastic deformation provides a relatively large amount of increase in reaction force against deformation, and plastic deformation has a small amount of increase in reaction force against deformation. Therefore, reaction force based on elastic deformation can be utilized effectively as collision resistance properties. If the second moment of area is set large, even small bending is likely to cause plastic buckling. In a conventional structure, the second moment of area of a door impact bar is set to approximately 18,000 mm$^4$, and it is assumed that collision resistance properties by plastic deformation are brought out. On the other hand, in the present embodiment, the upper limit value of the second moment of area is set as above in order to cause the reinforcing member 120 to undergo elastic deformation and bring out a collision resistance function. Thereby, the occurrence of plastic buckling can be suppressed, and a collision resistance function can be brought out by elastic deformation.

By the reinforcing member 120 satisfying the condition mentioned above regarding the second moment of area, the exterior panel 100 according to the present embodiment can improve collision resistance properties. Thus, the effect of further weight reduction can be obtained by the simplification or omission of conventional collision resistance components. In the case where conventional collision resistance components are used, the exterior panel 100 according to the present embodiment can contribute to further improvement in collision safety properties.

The yield stress of the reinforcing member 120 may be set to more than or equal to 500 MPa. Thereby, the plastic buckling limit of the reinforcing member 120 can be increased, and reaction force based on elastic deformation can be utilized still more effectively; thus, a weight reduction can be achieved while collision properties are ensured effectively. The reinforcing member 120 may be one having a martensite structure. Thereby, impact resistance properties can be further improved.

Further, even when the reinforcing member 120 is formed of a fine member, reinforcing members 120 serve as practical impact absorption members by crossing them. If the number of door impact bars 300 is only one like in a conventional structure, a hitting failure may occur depending on the position where a collision load is applied. If a plurality of door impact bars 300 are installed as a measure against hitting failure, a great weight increase is caused. According to the present embodiment, reinforcing members 120 having lighter weights than in the past can be arranged largely on the entire surface of the exterior panel 100, and therefore a hitting failure can be avoided while a weight increase is suppressed. Further, since the first and second reinforcing members 122 and 124 are connected together as the reinforcing members 120, a collision load applied to one reinforcing member propagates also through the other reinforcing member, and both members can absorb the impact together.

Further, in the case where the exterior material 110 and the reinforcing member 120 are joined together, the falling-in (rotation) of the reinforcing member 120 when the deformation of the reinforcing member 120 is large during collision deformation can be suppressed, and collision resistance properties can be further improved. Further, also a feature in which, during collision deformation, tension occurs in the exterior material in a region between adjacent reinforcing members 120 is effective. When the exterior material 110 is made thin, rigidity is lost, and the exterior material 110 becomes dented (warped) easily and is not useful for impact absorption; however, by joining the exterior material 110 and the reinforcing member 120 together to restrain the exterior material 110, when the reinforcing member 120 deforms, the exterior material 110 around the deformed place is pulled in the in-plane direction. Even though the exterior material 110 does not have rigidity in the thickness direction, it has tensile strength in the in-plane direction, and can therefore resist tensile deformation; thus, the properties of the impact absorption member can be improved.

A certain length or more of the reinforcing member 120 is placed along the exterior material 110. Specifically, the reinforcing member 120 is stuck to the exterior material 110 in a region of more than or equal to ⅓ of the total length of the reinforcing member 120. That is, in the present embodiment, the falling-down of the reinforcing member 120 is suppressed by sticking and joining the reinforcing member 120 and the exterior material 110 together, and the collision resistance function is improved by causing tension to act on the exterior material 110 during the deformation of the exterior material 110.

In particular, the first reinforcing member 122 is placed along the direction of the curvature of the exterior material 110 in such a manner that the longitudinal direction of the first reinforcing member 122 is the up and down direction. Thereby, the collision resistance function of a convex curved portion that is curved so as to protrude toward the outside of the automobile can be improved.

Further, the reinforcing member 120 goes across (traverses) the exterior material 110. In the present embodiment, the second moment of area of the reinforcing member 120 is small, and the yield stress is high (the elastic deformation region is large). Hence, the load and the impact at the time of a collision of the entire exterior panel 100 are caught by the entire member; thus, the reinforcing member 120 is preferably made as long as possible. Further, by the reinforcing member 120 going across the exterior material 110, the setting flexibility of a support point with which the reinforcing member that has received a collision load obtains reaction force (a contact point with another conventional component) can be enhanced. Further, by making the reinforcing member 120 as long as possible, the area where an impact is caught at the time of a collision can be enlarged. That is, an event in which the reinforcing member 120 experiences a hitting failure can be avoided.

Figure 8:
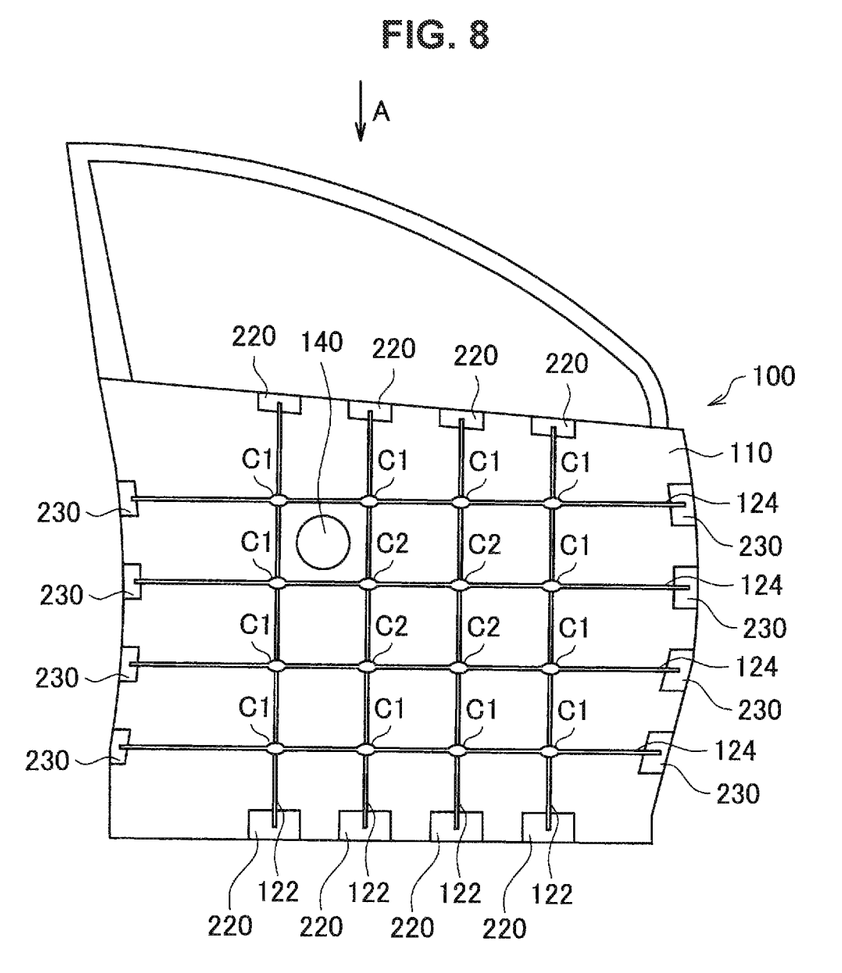
FIG. 8 is a schematic diagram showing an exterior panel (a door panel) in which first reinforcing members are arranged in an up and down direction of an exterior material and second reinforcing members are arranged in a horizontal direction of the exterior material 110.
Figure 9:
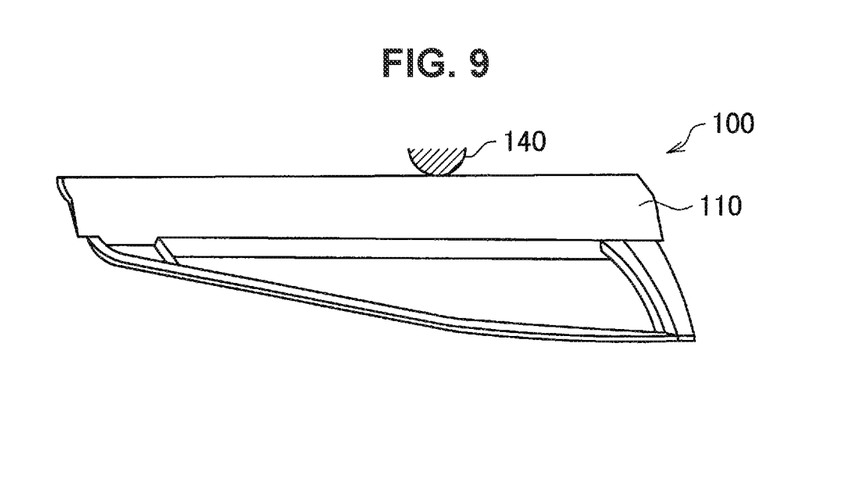
FIG. 9 is a schematic diagram showing a state viewed from a direction of arrow A of FIG. 8.
Figure 13:
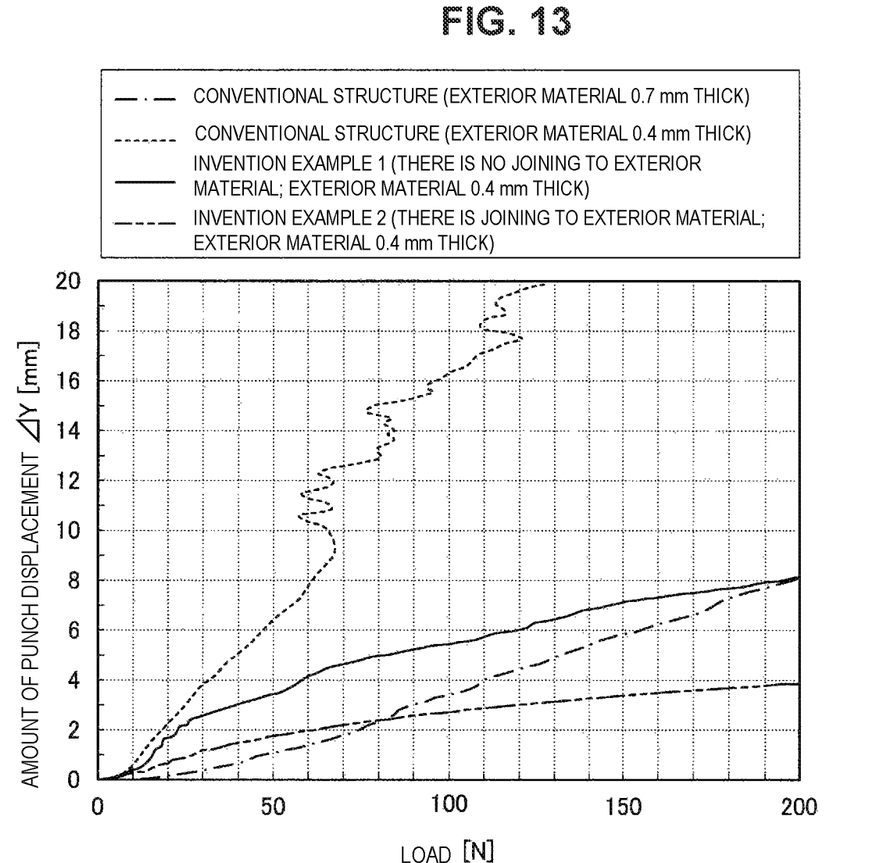
FIG. 13 is a characteristic diagram showing, in regard to FIG. 8 and FIG. 9, relationships between an application load of an indenter 140 and the amount of displacement, obtained by a simulation for evaluating tensile rigidity of an exterior panel.

In the following, improvement in the collision resistance function of the exterior panel 100 by providing the reinforcing member 120 is described. FIG. 8 is a schematic diagram showing an exterior panel 100 (a door panel) in which arrangement is made such that the longitudinal direction of the first reinforcing member 122 is the up and down direction of the exterior material 110 and the longitudinal direction of the second reinforcing member 124 is the horizontal direction of the exterior material 110, and shows the configuration of FIG. 5 in detail. FIG. 9 is a schematic diagram showing a state viewed from the direction of arrow A of FIG. 8. FIG. 8 shows a state where the exterior panel 100 is viewed from the front side (from the outside of the automobile). FIG. 8 shows an arrangement of first reinforcing members 122 and second reinforcing members 124 in a state where the exterior material 110 is seen through. The indenter 140 shown in FIG. 8 is a member that presses the exterior panel 100 in a simulation for evaluating the tensile rigidity of the exterior panel 100, the result of which simulation is shown in FIG. 13 described later.

In FIG. 8, the first reinforcing member 122 is supported by support units 220 arranged at both ends in the up and down direction of the exterior panel 100. Further, the second reinforcing member 124 is supported by support units 230 arranged at both ends in the horizontal direction of the exterior panel 100. More specifically, both ends of the first reinforcing member 122 are sandwiched and supported by the exterior material 110 and the support units 220. Similarly, both ends of the second reinforcing member 124 are sandwiched and supported by the exterior material 110 and the support units 230. In FIG. 8, the distance between a cross portion on the outside in the up and down direction of the vehicle or on the outside in the front and rear direction among the cross portions between the first reinforcing members 122 and the second reinforcing members 124 and a supported portion of the first reinforcing member 122 or the second reinforcing member 124 supported by the support unit 220 or the support unit 230 is within ⅓ of the length of the first reinforcing member 122 or the second reinforcing member 124, respectively. Thereby, when a load caused by a collision is applied to reinforcing members 120, the load caused by the collision can be caught by elastic deformation with good efficiency because, for example, the load applied to second reinforcing members 124 is applied to first reinforcing members 122 via cross portions and the distance from a cross portion to the supported portion of the first reinforcing member 122 supported by the support unit 220 is short.

FIG. 8 shows an example in which concave portions 122a and 124a are provided and crossed in a cross portion between the first reinforcing member 122 and the second reinforcing member 124 and thereby the first reinforcing member 122 and the second reinforcing member 124 are arranged in the same plane. In FIG. 8, first reinforcing members 122 and second reinforcing members 124 are arranged in an interknitted manner, and the vertical arrangement of the first reinforcing member 122 and the second reinforcing member 124 is made different between adjacent cross portions.

When the first and second reinforcing members 122 and 124 are arranged in an interknitted manner, the efficiency of load transfer between the first reinforcing member 122 and the second reinforcing member 124 is improved. Thereby, at the time of a collision, an impact absorption function can be ensured effectively by the first and second reinforcing members 122 and 124.

Figure 10:
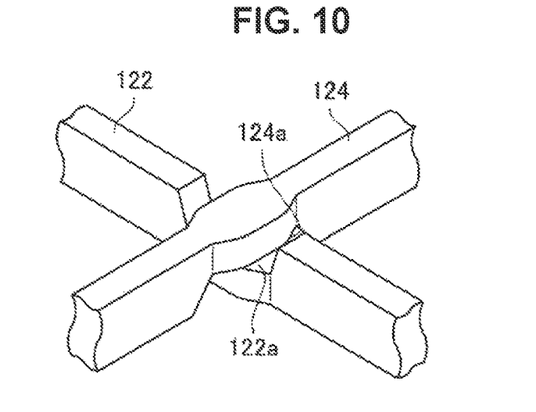
FIG. 10 is a perspective view showing a cross portion between a first reinforcing member and a second reinforcing member in FIG. 8 in detail.
Figure 11:
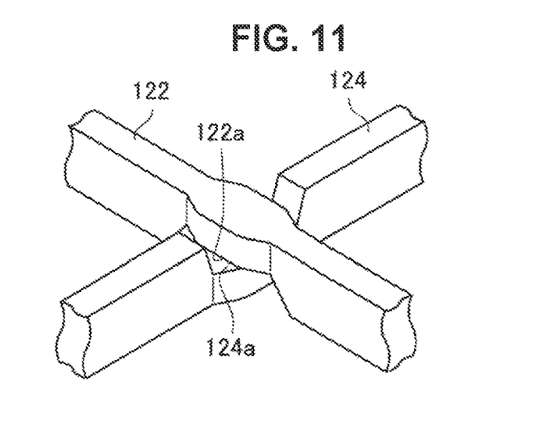
FIG. 11 is a perspective view showing a cross portion between a first reinforcing member and a second reinforcing member in FIG. 8 in detail.

FIG. 10 and FIG. 11 are perspective views showing cross portions between the first reinforcing member 122 and the second reinforcing member 124 in FIG. 8 in detail. FIG. 10 corresponds to cross portion C1 shown in FIG. 8, and FIG. 11 corresponds to cross portion C2 shown in FIG. 8. In cross portion C1, the second reinforcing member 124 is located more on the outside of the vehicle (on the exterior material 110 side) than the first reinforcing member 122. Thus, the first and second reinforcing members 122 and 124 can be arranged in an interknitted manner. By concave portion 122a being provided in the first reinforcing member 122 and concave portion 124a being provided in the second reinforcing member 124, the first reinforcing member 122 and the second reinforcing member 124 are arranged in the same plane. In cross portion C2, the first reinforcing member 122 is located more on the outside of the vehicle than the second reinforcing member 124. Also in cross portion C2, by concave portion 122a being provided in the first reinforcing member 122 and concave portion 124a being provided in the second reinforcing member 124, the first reinforcing member 122 and the second reinforcing member 124 are arranged in the same plane.

Although illustration is omitted, the first and second reinforcing members 122 and 124 do not necessarily need to be arranged in an interknitted manner; for a reason regarding fabrication at the time of fixing to the exterior panel 100 or the like, all first reinforcing members 122 may be arranged more on the exterior panel side than all second reinforcing members 124, or conversely all second reinforcing members 124 may be arranged more on the exterior panel side than all first reinforcing members 122.

The second moment of area in a direction orthogonal to the longitudinal direction of the reinforcing member 120 extending from a cross portion is less than or equal to 15,000 mm$^4$. By providing a cross portion, the distance between a support point of bending deformation that is given to the reinforcing member 120 at the time of the input of a collision load and the point of application can be shortened, and therefore the amount of increase in reaction force against deformation can be further increased. Thus, collision properties are improved by providing a cross portion.

Further, by providing two or more cross portions, the distance between a support point of bending deformation that is given to the reinforcing member 120 at the time of the input of a collision load and the point of application can be further shortened, and therefore the amount of increase in reaction force against deformation can be increased even more. Further, an impact load can be propagated through and caught by a plurality of other reinforcing members 120, and therefore still higher reaction force can be obtained. Thereby, collision properties are improved even more.

In the cross portion, concave portions 122a and 124a are provided in the first and second reinforcing members 122 and 124, respectively; thereby, the thickness of each of the first reinforcing member 122 and the second reinforcing member 124 in the direction orthogonal to the exterior material 110 is reduced. Thereby, the first and second reinforcing members 122 and 124 and the exterior material 110 can be stuck and joined together also in a neighboring region including the cross portion, and collision properties can be improved effectively.

Further, by providing a cross portion, the first reinforcing member 122 and the second reinforcing member 124 are restrained to each other in the cross portion. Thereby, for example, in the case where the reinforcing member 120 has a cross section of a rectangle and the side of the short side is stuck to the exterior material 110, an event in which, upon reception of a collision, the reinforcing member 120 experiences falling-down and the side of the long side comes close to the exterior material 110 can be prevented. Further, by arranging first and second reinforcing members 122 and 124 in an interknitted manner, an event in which, upon reception of a collision, the reinforcing member 120 experiences falling-down and the side of the long side comes close to the exterior material 110 can be prevented. When the spacing between cross portions is shortened, the restraint of rotation prevention is made at a short spacing, and therefore the first and second reinforcing members 122 and 124 are less likely to fall down. Thereby, a reduction in the second moment of area due to the falling-down of the reinforcing member 120 can be prevented, and a reduction in collision resistance properties can be prevented.

The impact absorption member needs to be supported by something and catch an impact load so that the impact absorption member does not make rigid-body movement with respect to the direction of load input. Since a load is inputted from the exterior material 110, support units 220 and 230 that catch an impact load are provided on the opposite side of reinforcing members 120 from the exterior material 110. At this time, when the point of load input to the reinforcing member 120 (a cross portion) and the support unit 220 or 230 are nearer, higher reaction force can be obtained with smaller deformation. In the case where the exterior panel 100 is a door panel, a part in contact with a door inner panel, a front pillar, a center pillar, a side sill, or the like falls under the support unit 220 or 230. In the case of an exterior panel 100 other than a door, the exterior panel 100 may be supported by keeping support units 220 and 230 in contact with other body structure materials. For example, in the case of a panel of a roof, a part in contact with a roof side rail, a front roof rail, a rear roof rail, or the like corresponds to the support unit 220 or 230. The support units 220 and 230 may be brought into contact with these body structure materials via other support components additionally provided, and may be supported.

In the reinforcing member 120, the supported portion supported by the support unit 220 or 230 is an end portion of the reinforcing member 120. Thus, by supporting end portions of the reinforcing member 120, the entire reinforcing member 120 can be utilized for impact absorption. Further, by joining the supported portion to some other component than the exterior material, the supported portion can be restrained also in a direction other than the direction of load input; thus, collision properties can be improved, and contributions to the prevention of the falling-in of the reinforcing member 120 etc. can be made. The supported portion may be provided in a place other than an end portion of the reinforcing member 120.

FIG. 12 is a schematic diagram showing a cross-sectional configuration in a direction orthogonal to the longitudinal direction of each of the first and second reinforcing members 122 and 124 in the configuration of FIG. 8. As shown in FIG. 12, each of the first and second reinforcing members 122 and 124 has a cross-sectional shape of a rectangle, with a size of approximately 16 mm vertically and approximately 10 mm horizontally, as an example.

In the configuration shown in FIG. 12, the side of the short side of the cross-sectional shape of a rectangle is stuck to the exterior material 110. Thereby, a reinforcing member 120 having a cross-sectional shape with the best efficiency can be formed in order to ensure a desired second moment of area. On the other hand, when the side of the long side is made long in order to ensure the second moment of area, upon reception of an impact, the reinforcing member 120 is likely to rotate around the axial direction and fall in. If the reinforcing member 120 falls in, the second moment of area is reduced; however, the falling-in (rotation) of the reinforcing member 120 can be prevented by joining the reinforcing member 120 to the exterior material 110.

Figure 16:
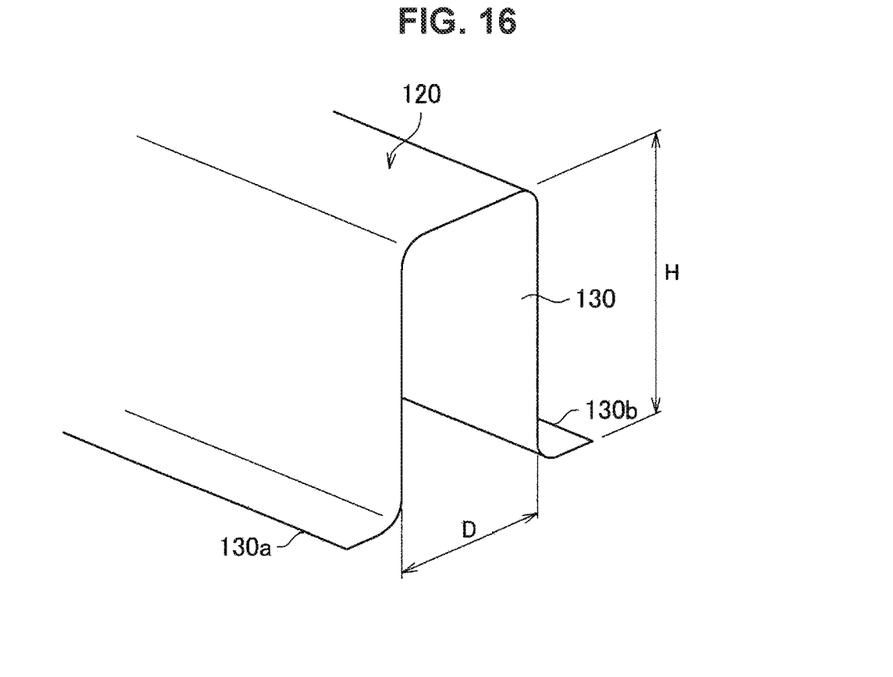
FIG. 16 is a schematic diagram showing an example in which each of ends of a sheet material is bent on an opposite side to a bending side of the configuration shown in FIG. 12.

FIG. 16 is a schematic diagram showing an example in which each of end 130a and end 130b of a sheet material 130 is bent on the opposite side to the bending side of the configuration shown in FIG. 12. The shape of FIG. 16 is referred to as a hat shape.

Also in the configuration shown in FIG. 16, the side of the short side of the cross-sectional shape of a rectangle is stuck to the exterior material 110. At this time, the flange side having ends 130a and 130b may be taken as the bottom surface and be stuck to the exterior material 110, or the opposite side to the flange side having ends 130a and 103b may be taken as the bottom surface and be stuck to the exterior material 110. Thereby, a reinforcing member 120 having a cross-sectional shape with the best efficiency can be formed in order to ensure a desired second moment of area. Further, the falling-in (rotation) of the reinforcing member 120 can be prevented by joining the reinforcing member 120 to the exterior material 110.

Figure 14:
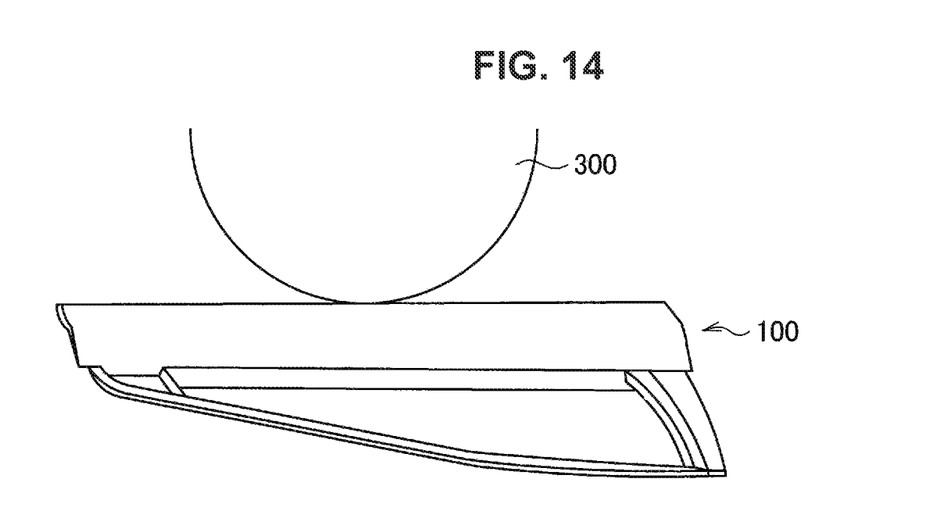
FIG. 14 is a schematic diagram showing a state where a collision of a side surface of an automobile (a side collision) is envisaged and an application load is applied to an exterior panel by a load application member.
Figure 15:
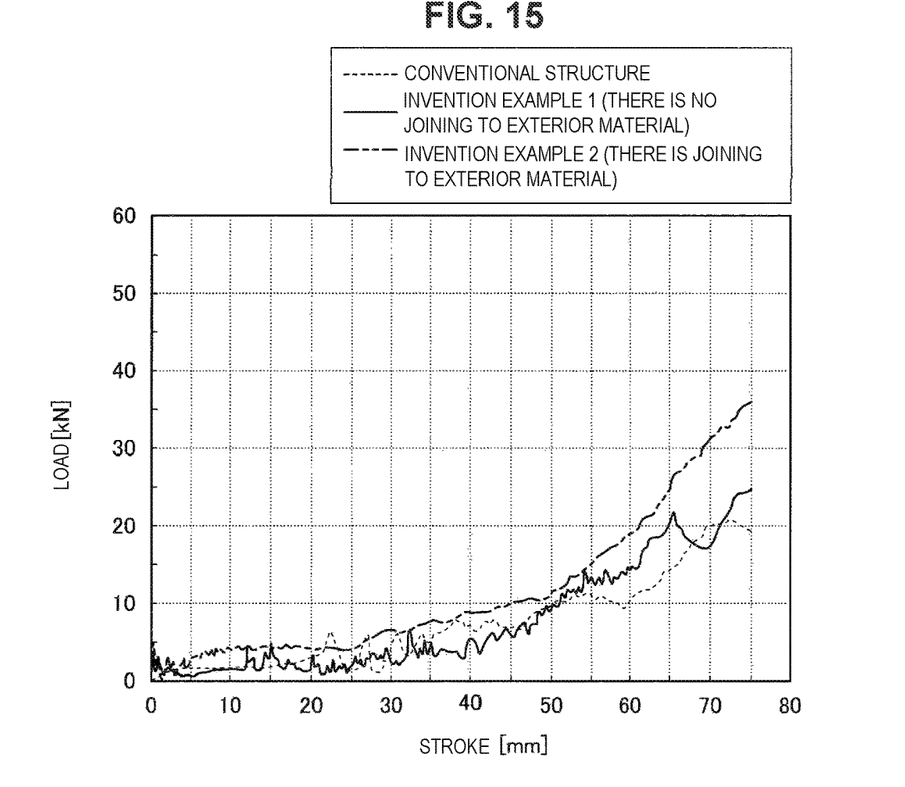
FIG. 15 is a characteristic diagram showing, in the configuration of FIG. 8, relationships between a stroke and a load when a load is applied by a load application member 300, obtained by a simulation for evaluating properties of a side surface collision of an exterior panel.

Next, the result of evaluation of the bending strength of the exterior panel 100 according to the present embodiment with consideration of the occasion of a collision is described on the basis of FIG. 14 and FIG. 15. FIG. 14 is a schematic diagram showing a state where, in the configuration of FIG. 8, a collision of a side surface of an automobile (a side collision) is envisaged and an application load is applied to the exterior panel 100 by a load application member 300.

FIG. 15 is a characteristic diagram showing, in the configuration of FIG. 8, relationships between the stroke and the load when a load is applied by the load application member 300. FIG. 15 shows a case where a load larger than the load of FIG. 13 is applied and a stroke equivalent to the occasion of a collision is made in order to evaluate the collision resistance function. In FIG. 15, the characteristics shown by the broken line show characteristics in a case where the conventional structure shown in FIG. 2 is evaluated under the same conditions for comparison. Further, the characteristics shown by the solid line correspond to Invention Example 1 in which neither the first reinforcing member 122 nor the second reinforcing member 124 is joined to the exterior material 110, and the characteristics shown by the alternate long and two short dashes line correspond to Invention Example 2 in which the first reinforcing member 122 and the second reinforcing member 124 are joined to the exterior material 110.

As shown in FIG. 15, in the configuration of Invention Example 1, the load is higher than the load in the conventional structure particularly when the stroke is more than or equal to 50 mm, and impact absorption properties higher than those of the conventional structure have been obtained. In the configuration of Invention Example 2, the load is higher than the load in the conventional structure in almost the entire region of the stroke, and impact absorption properties still higher than those of Invention Example 1 have been obtained. As described above, in the conventional structure, it is assumed that an impact resistance member such as a door impact bar 300 is caused to undergo plastic deformation; therefore, as the stroke becomes larger, plastic deformation becomes more likely to occur; thus, the rate of increase of the load due to the increase of the stroke is lower than in Invention Example 1 and Invention Example 2. On the other hand, in Invention Example 1 and Invention Example 2 according to the present embodiment, impact absorption is made in the range of elastic deformation, and therefore the rate of increase of the load due to the increase of the stroke is larger than in the conventional structure. Thus, by the configuration example of FIG. 9, sufficient impact absorption properties can be obtained even when, for example, a side collision of a pole in which a utility pole or the like collides with the door panel occurs.

The simulation result shows that, in the configuration of FIG. 8, plastic buckling did not occur even at strokes up to approximately 75 mm in both Invention Example 1 and Invention Example 2. Thus, according to the present embodiment, the impact of a collision can be absorbed by using the reinforcing member 120 as an elastic member. In Invention Example 1, the load has dropped temporarily at a stroke of approximately 65 mm; this is because part of the reinforcing member 120 experienced falling-down due to the fact that the reinforcing member 120 was not joined to the exterior material 110. However, such falling-down of the reinforcing member 120 can be suppressed by joining the reinforcing member 120 and the exterior material 110 together like in Invention Example 2, providing a cross portion in the reinforcing member 120 as described above, or arranging reinforcing members 120 in different directions in an interknitted manner.

The first reinforcing member 122 and the second reinforcing member 124 may not be separate members, and the first and second reinforcing members 122 and 124 may be formed as one body by, for example, processing one steel sheet into a press molded body in a lattice configuration having a thin cross section. In this case, a branched place serves as a cross portion.

The exterior material 110 and the reinforcing member 120 are not limited to a steel material, and may be formed of a nonferrous metal such as aluminum, or the like, for example. Further, for example, the exterior material 110 may be formed of a CFRP, and ribs corresponding to first and second reinforcing members 122 and 124 may be arranged on the back side of the exterior material 110. In this case, the ribs corresponding to the first and second reinforcing members 122 and 124 may be molded integrally. In this case, a branched place (a cruciform place) is regarded as a cross portion. Further, the ribs corresponding to the first and second reinforcing members 122 and 124 may be molded integrally with the exterior material 110; in this case, the ribs corresponding to the first and second reinforcing members 122 and 124 are regarded as being joined to the exterior material 110.

As described hereinabove, by the reinforcing member 120 of the present embodiment, the impact resistance properties of the exterior material 110 can be improved with reliability. Further, by the reinforcing member 120 of the present embodiment, also the tensile rigidity of the exterior material 110 can be improved. In the following, improvement in tensile rigidity by the reinforcing member 120 of the present embodiment is described.

As described above, in the present embodiment, the first and second reinforcing members 122 and 124 are in contact with the exterior material 110. Thereby, the area of each of the regions surrounded by the first and second reinforcing members 122 and 124 and the outline of the exterior material 110 is smaller than the area of the entire exterior material 110; therefore, it is likely that tension will occur earlier when external force acts on the exterior material 110, and hence the tensile rigidity of the exterior material 110 can be enhanced much. It is more preferable that the exterior material 110 and the reinforcing member 120 be joined together; thus, when the exterior material 110 deforms, tension occurs still earlier in the exterior material 110 in a region between adjacent reinforcing members 120, and tensile rigidity can be improved even more.

The yield stress of the reinforcing member 120 is set to more than or equal to 500 MPa as described above. Thereby, even when external force acts on the reinforcing member 120, the occurrence of plastic deformation can be prevented; thus, tensile rigidity can be ensured effectively, and a weight reduction can be achieved.

A certain length or more of the reinforcing member 120 is placed along the exterior material 110. Specifically, the reinforcing member 120 is stuck to the exterior material 110 in a region of more than or equal to ⅓ of the total length of the reinforcing member 120. By placing the reinforcing member 120 such that it is stuck to the exterior material 110, the tensile rigidity of the exterior panel 100 can be improved even when the degree of wall thickness reduction of the exterior material 110 is increased (for example, a wall thickness reduction from 0.7 mm to less than or equal to 0.5 mm in terms of the original thickness). The reinforcing member 120 and the exterior material 110 are more preferably stuck and joined together, and thereby the tensile rigidity of the exterior panel 100 can be enhanced more by causing tension to act on the exterior material 110 during the deformation of the exterior material 110.

In particular, the first reinforcing member 122 is placed in the up and down direction along the direction of the curvature of the exterior material 110. Thereby, the tensile rigidity of a convex curved portion that is curved so as to protrude toward the outside of the automobile can be improved. Further, the exterior material 110 has a concave curved portion that is curved so as to protrude toward the inside as viewed from the outside of the automobile, and the reinforcing member 120 overlapping with the concave curved portion is stuck to the exterior material 110. The concave curved portion is inferior to the convex curved portion in tensile rigidity against a load from the outside of the automobile; thus, the tensile rigidity of the entire exterior panel can be improved effectively by placing the reinforcing member 120 such that it is stuck to the concave curved portion.

In the reinforcing member 120, the second moment of area in a direction orthogonal to the longitudinal direction may be set to less than or equal to 15,000 mm$^4$. By the reinforcing member 120 satisfying the condition mentioned above regarding the second moment of area, the reinforcing member 120 is allowed to have a small cross-sectional shape; thus, even when a plurality of first and second reinforcing members 122 and 124 are arranged in order to enhance tensile rigidity, a large weight increase is not caused, and tensile rigidity can be improved efficiently. Also in a reinforcing member 120 extending from a cross portion like those shown in FIG. 8, similarly the second moment of area in a direction orthogonal to the longitudinal direction may be set to less than or equal to 15,000 mm$^4$. When there is a cross portion, the area of a region of the exterior material sandwiched by reinforcing members 120 extending from the cross portion is smaller than the area of the entire surface of the exterior panel, and the ratio of the sheet thickness to the area sandwiched by reinforcing members 120 is relatively increased; therefore, tensile rigidity can be improved more. Thus, tensile rigidity can be improved effectively by providing a cross portion.

Further, by providing two or more cross portions, the individual region sandwiched by adjacent reinforcing members 120 of the exterior material 110 is made still smaller. As a result, the ratio of the sheet thickness to the area of the individual region is relatively increased; therefore, tensile rigidity can be further improved. Thus, tensile rigidity can be improved effectively.

In the cross portion, concave portions 122a and 124a are provided in the first and second reinforcing members 122 and 124, respectively; thereby, the thickness of each of the first reinforcing member 122 and the second reinforcing member 124 in the direction orthogonal to the exterior material 110 is reduced. Thereby, the first and second reinforcing members 122 and 124 and the exterior material 110 can be stuck or joined together also in a neighboring region including the cross portion, and tensile rigidity can be improved effectively.

FIG. 13 is a characteristic diagram showing, regarding FIG. 8 and FIG. 9, relationships between the application load of an indenter 140 and the amount of displacement, obtained by a simulation in order to evaluate tensile rigidity. The simulation result shown in FIG. 13 shows a case where the thickness of the exterior material 110 is 0.4 mm and neither the first reinforcing member 122 nor the second reinforcing member 124 is joined to the exterior material 110 (Invention Example 1, the characteristics shown by the solid line) and a case where the thickness of the exterior material 110 is 0.4 mm and the first reinforcing member 122 and the second reinforcing member 124 are joined to the exterior material 110 (Invention Example 2, the characteristics shown by the alternate long and two short dashes line). The simulation result shown in FIG. 13 shows, for comparison, also characteristics in a case where the thickness of the exterior material 110 is 0.7 mm and there is no reinforcing member (the alternate long and short dash line) and characteristics in a case where the thickness of the exterior material 110 is 0.4 mm and there is no reinforcing member (the broken line).

The thickness of a common automotive exterior member or exterior panel in current use is approximately 0.7 mm, and is equivalent to the characteristics of the alternate long and short dash line. As shown in FIG. 13, Invention Example 2 (the alternate long and two short dashes line) in which the first reinforcing member 122 and the second reinforcing member 124 are joined to the exterior material 110 has obtained a result in which the amount of displacement with respect to the application load is equal to or more than that in the characteristics in the case where the thickness of the exterior material 110 is 0.7 mm and there is no reinforcing member (the alternate long and short dash line). In particular, in Invention Example 2, when the load is more than 80[N], the amount of displacement with respect to the application load is much lower than that in the characteristics of the alternate long and short dash line. Further, in the characteristics of Invention Example 1 (the solid line) in which neither the first reinforcing member 122 nor the second reinforcing member 124 was joined to the exterior material 110, the amount of displacement with respect to the application load was slightly larger than that in the characteristics of the alternate long and short dash line, but was equal to that in the characteristics of the alternate long and short dash line when the application load was approximately 200[N]. Therefore, according to the present embodiment, a reduction in tensile rigidity can be prevented with reliability even when the thickness of the exterior material 110 is set to 0.4 mm, which is much thinner than at present. Thus, the thickness of the exterior material 110 can be reduced to, for example, approximately 0.4 mm, and the exterior panel 100 can be reduced much in weight.

As shown by the characteristics of the broken line in FIG. 13, in the characteristics in the case where the thickness of the exterior material 110 is 0.4 mm and there is no reinforcing member, the amount of displacement with respect to the application load is much larger than those in the other characteristics. This shows that the exterior material 110 deforms largely when the exterior panel is pushed. Therefore, in the case where the thickness is 0.4 mm and there is no reinforcing member, the exterior material is difficult to use as an automotive exterior panel.

According to the present embodiment as described above, a plurality of first reinforcing members 122 and a plurality of second reinforcing members 124 may be arranged in a lattice configuration and stuck to the exterior material 110, and a collision load may be caused to be absorbed principally by elastic deformation; thereby, collision resistance properties can be improved much. Thus, an automotive exterior panel in which a weight reduction is achieved, collision resistance properties are excellent can be provided.

In addition, reinforcing members 120 are arranged on and stuck to an exterior material 110 formed of an approximately 0.4-mm thin sheet, and thereby tensile rigidity can be enhanced significantly. Thus, the deformation of the exterior panel 100 can be prevented even when a user touches an exterior panel 100 formed of a thin sheet or a user pushes the exterior panel 100.

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

REFERENCE SIGNS LIST 100 exterior panel
110 exterior material
120 reinforcing member 122 first reinforcing member
124 second reinforcing member

The invention claimed is:

1. An impact absorption member comprising:
a first member extending in a first direction;
a second member extending in a second direction different from the first direction and crossing the first member; and
a cross portion between the first member and the second member,
the first member and the second member being placed adjacent to an exterior material of an automobile,
a height of the first member in a direction orthogonal to the exterior material being larger than a width of the first member in a direction along the exterior material in a cross section orthogonal to an extending direction of the first member,
a height of the second member in a direction orthogonal to the exterior material being larger than a width of the second member in a direction along the exterior material in a cross section orthogonal to an extending direction of the second member, and
the exterior material is an exterior material of a door of an automobile, an exterior material of a fender of an automobile, an exterior material of a hood of an automobile, or an exterior material of a roof of an automobile,
wherein the first member and the second member are each a hollow structure in which a sheet material is bent, and has a first surface adjacent to the exterior material and a second surface that is larger than the first surface in width orthogonal to the extending direction and is placed apart from the first surface.

2. The impact absorption member according to claim 1, comprising:
two or more said first members; and
two or more said cross portions.

3. The impact absorption member according to claim 2, wherein a cross portion between a first member and the second member in which the second member is placed on a side of the exterior material is present between two cross portions between two first members and the second member in which the two first members are placed on the side of the exterior material.

4. The impact absorption member according to claim 1, wherein the first member and the second member are joined to the exterior material.

5. The impact absorption member according to claim 1, wherein thicknesses of the first member and the second member in the direction orthogonal to the exterior material are reduced in the cross portion.

6. The impact absorption member according to claim 1, wherein the first member or the second member traverses the exterior material.

7. The impact absorption member according to claim 1, wherein a supported portion supported on an opposite side to the exterior material is present in at least one place in a longitudinal direction of the first member or the second member, and
a distance between the cross portion and the supported portion is within ⅓ of a length of the first member or the second member in which the supported portion is present.

8. The impact absorption member according to claim 7, wherein the supported portion is an end portion of the first member or the second member.

9. The impact absorption member according to claim 7, wherein the supported portion is joined to some other component than the exterior material.

10. The impact absorption member according to claim 1, wherein the second surface is divided along the extending direction.

11. The impact absorption member according to claim 1, wherein the first member and the second member each has a martensite structure.

12. The impact absorption member according to claim 1, wherein the first member and the second member do not contact with a panel that is paired with the exterior material.

* * * * *